(12) United States Patent
Noh et al.

(10) Patent No.: US 11,960,687 B2
(45) Date of Patent: Apr. 16, 2024

(54) TOUCH PANEL, LAMINATE HAVING THE SAME, AND MANUFACTURING METHOD THEREOF

(71) Applicant: DONGWOO FINE-CHEM CO., LTD., Iksan-si (KR)

(72) Inventors: Sung Jin Noh, Hanam-si (KR); Ki Joon Park, Hwaseong-si (KR); Jungu Lee, Suwon-si (KR)

(73) Assignee: DONGWOO FINE-CHEM CO., LTD., Iksan-si (KR)

( * ) Notice: Subject to any disclaimer, the term of this patent is extended or adjusted under 35 U.S.C. 154(b) by 227 days.

(21) Appl. No.: 17/646,512

(22) Filed: Dec. 30, 2021

(65) Prior Publication Data

US 2022/0206632 A1    Jun. 30, 2022

(30) Foreign Application Priority Data

Dec. 31, 2020 (KR) .................. 10-2020-0189499

(51) Int. Cl.
 *G06F 3/044* (2006.01)
(52) U.S. Cl.
 CPC .. *G06F 3/0443* (2019.05); *G06F 2203/04103* (2013.01); *G06F 2203/04112* (2013.01)

(58) Field of Classification Search
CPC ....................................... G06F 3/0443
USPC ................................. 345/173, 174
See application file for complete search history.

(56) References Cited

U.S. PATENT DOCUMENTS

| | | | |
|---|---|---|---|
| 2016/0260780 A1* | 9/2016 | Kim | G06F 1/1652 |
| 2020/0089384 A1* | 3/2020 | Wang | G06F 3/04164 |
| 2020/0166800 A1* | 5/2020 | Smith | G02F 1/134363 |
| 2020/0174624 A1* | 6/2020 | Ma | G06F 3/0445 |
| 2020/0241702 A1* | 7/2020 | Omote | B32B 23/20 |

FOREIGN PATENT DOCUMENTS

| | | |
|---|---|---|
| JP | 6445365 B2 | 12/2018 |
| KR | 10-2018-0097212 A | 8/2018 |

* cited by examiner

*Primary Examiner* — Calvin C Ma
(74) *Attorney, Agent, or Firm* — Sughrue Mion, PLLC

(57) ABSTRACT

A manufacturing method of a touch panel includes steps of sequentially forming a metal layer and a blackening layer on a base layer in a multi-chamber, patterning the metal layer and the blackening layer in a mesh pattern, and etching the metal layer and the blackening layer to form a metal mesh electrode with the blackening layer formed.

18 Claims, 4 Drawing Sheets

[Figure 1A]
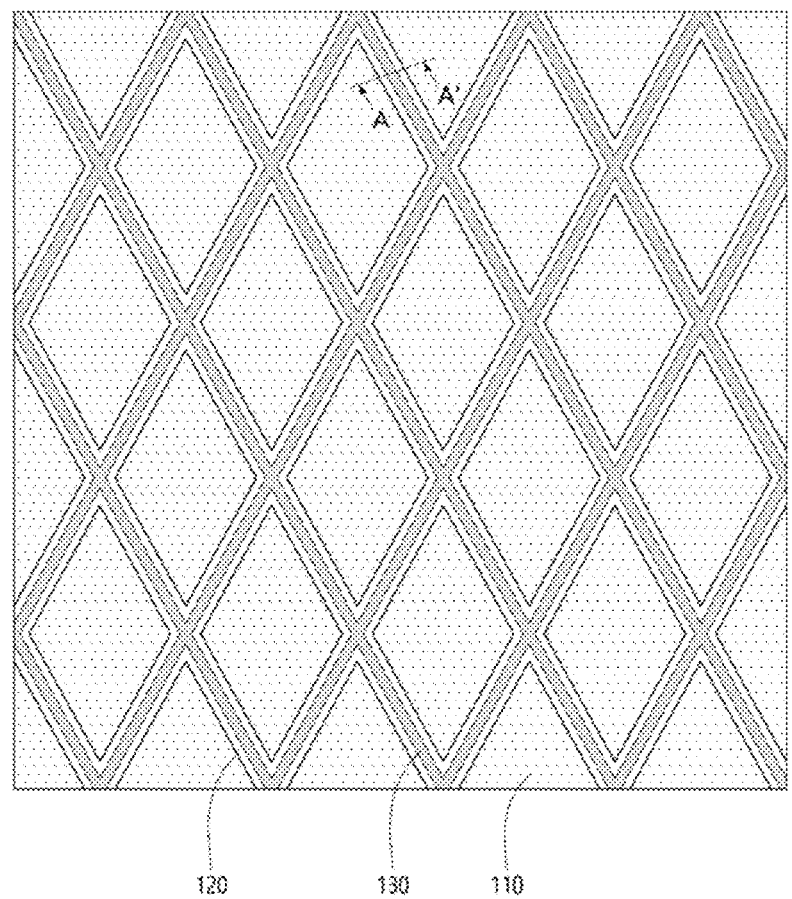
[Figure 1B]
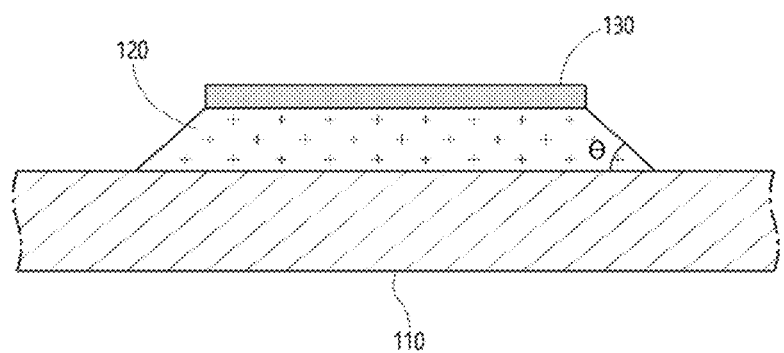

[Figure 2A]
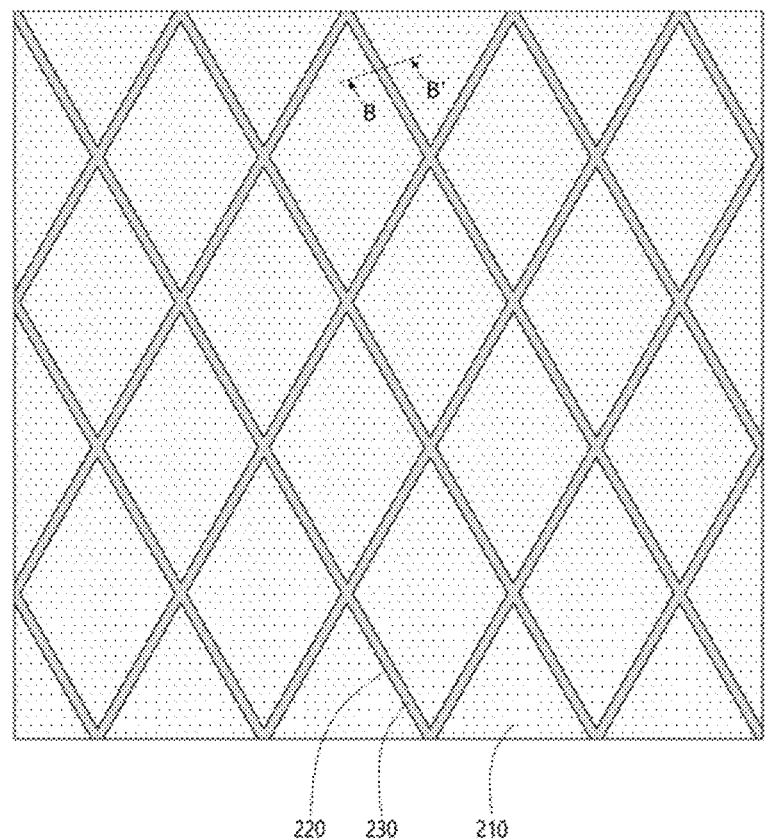
[Figure 2B]
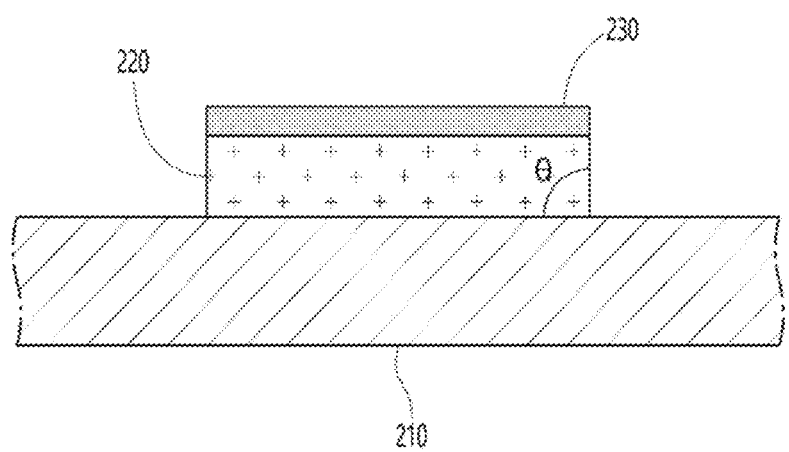

[Figure 3A]
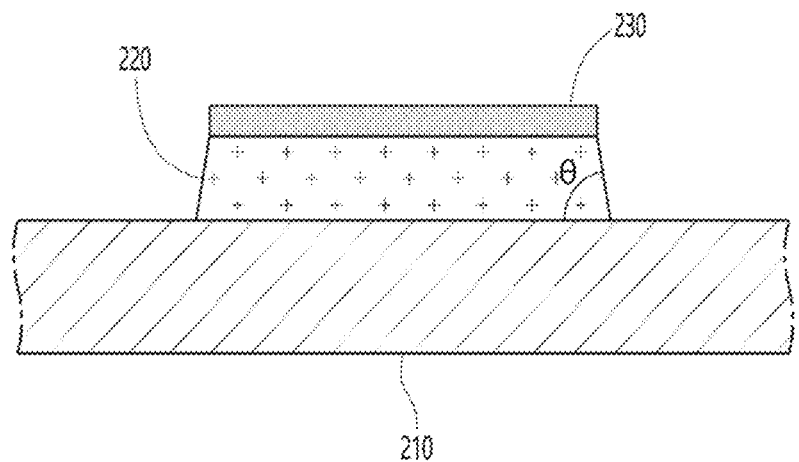
[Figure 3B]
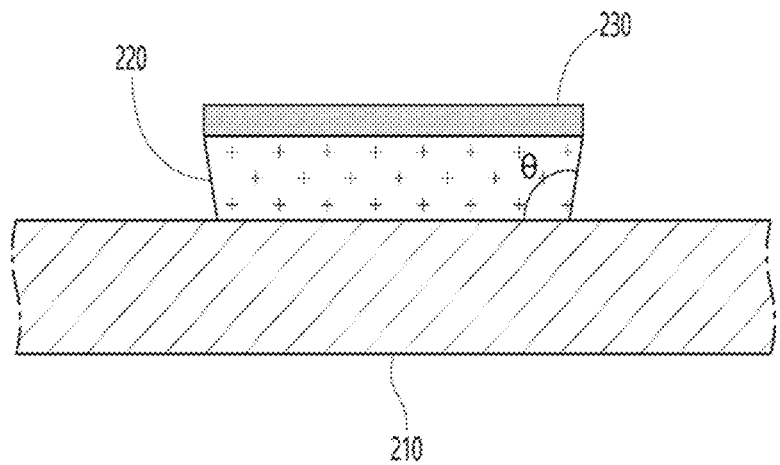

[Figure 4]
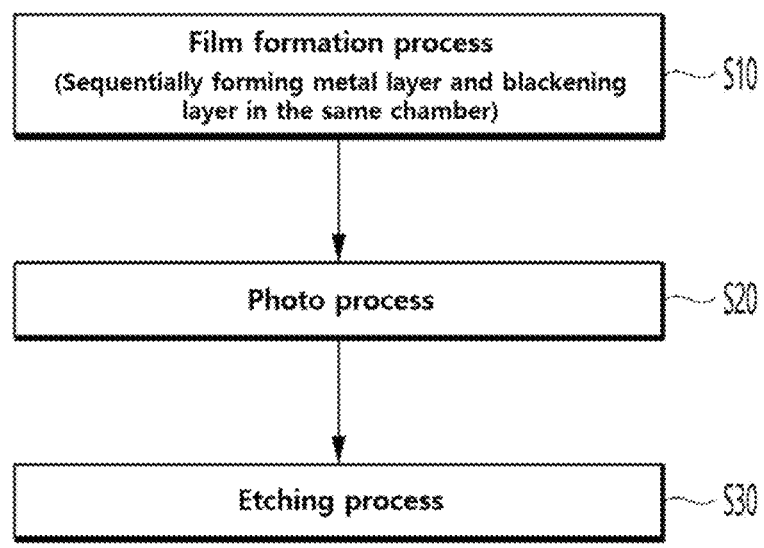

TOUCH PANEL, LAMINATE HAVING THE SAME, AND MANUFACTURING METHOD THEREOF

CROSS REFERENCE TO RELATED APPLICATIONS

This application claims priority based on Korean Patent Application No. 10-2020-0189499, filed Dec. 31, 2020, the entire content of which is incorporated herein by reference in its entirety.

TECHNICAL FIELD

The present invention relates to a touch panel. Particularly, the present invention relates to a touch panel capable of minimizing visibility of a metal mesh electrode having a blackening layer laminated.

BACKGROUND ART

A touch sensor of a smartphone or the like senses a touch signal and it may include a plurality of sensing electrodes. The sensing electrodes may be classified into the first sensing electrodes connected in the X axis direction and the second sensing electrodes connected in the Y axis direction. The sensing electrodes may respectively be connected to the first and second wiring parts. The first and second wiring parts may extend along side edges of the transparent substrate to be connected to pad electrodes formed at a bottom edge of the transparent substrate, i.e. bezel area. The pad electrode may then be connected to a flexible printed circuit board (FPCB) through an anisotropic conductive film (ACF) or the like.

FIGS. 1A and 1B illustrate a touch panel having a metal mesh electrode with a blackening layer laminated according to the prior art.

As shown in FIGS. 1A and 1B, the touch panel may have a sensing electrode formed of a conductive metal instead of a transparent oxide. In this case, the touch panel configures the conductive metal in a mesh pattern for flexibility, transmittance, and visibility. The metal mesh electrode refers to a conductive metal formed in a mesh shape (mesh pattern) as shown in FIG. 1A. However, the metal mesh electrode has a high reflectance due to the characteristics of the material. In order to solve such a high reflectance, a blackening layer is formed on the upper surface of the metal electrode layer of the touch panel.

In the manufacturing process of the touch panel, a metal layer 120 is first formed on a base layer 110 in the first chamber, and then a blackening layer 130 is formed in the second chamber, followed by a photo process and an etching process. However, in the process of transferring the base layer 110 on which the metal layer 120 is formed from the first chamber to the second chamber, the metal layer 120 may be exposed to air. In this case, a thin metal oxide film may be formed on the metal layer 120.

The metal oxide layer lowers the adhesion between the metal layer 120 and the blackening layer 130, so that etching may proceed relatively quickly between the metal layer 120 and the blackening layer 130 in the etching process. In this case, the gap between the metal layer 120 and the blackening layer 130 is gradually widened during the etching process. As a result, as the etching is further accelerated on the upper side of the metal layer 120 adjacent to the blackening layer 130, a positive taper inclination in which the side surface of the metal layer 120 has a lower width greater than an upper width may become severe. This increases the area of the metal layer 120 that is not covered by the blackening layer 130, thereby further exacerbating the visibility problem caused by side exposure of the metal layer 120.

DISCLOSURE

Technical Problem

The present invention is to solve the above problems of the prior art and it is an object to minimize the reflectance of the metal mesh electrode by completely covering the metal layer with the blackening layer by making the side surface of the metal layer vertical when forming the metal mesh electrode with the blackening layer laminated.

Technical Solution

A touch panel of the present invention for achieving this purpose may include a base layer, a metal electrode layer, a blackening layer, and so on.

The metal electrode layer may be formed on the base layer and configured in a mesh pattern.

The blackening layer may be formed on the metal electrode layer and have the same width as a top width of the metal electrode layer.

In the touch panel according to the present invention, a side surface of the metal electrode layer may be a vertical plane having the same top and bottom widths.

In the touch panel according to the present invention, a side surface of the metal electrode layer may have a positive tapered shape in which a bottom width is larger than a top width. The positive taper inclination angle may be 80° or more and less than 90° with respect to the base layer.

In the touch panel according to the present invention, a side surface of the metal electrode layer may have a reverse tapered shape in which a bottom width is smaller than a top width. The reverse taper inclination angle may be more than 90° and 100° or less with respect to the base layer.

A laminate according to the present invention may include the touch panel described above, and a window laminated on the touch panel.

The laminate according to the present invention may further include a polarizing layer laminated on one surface of the touch panel or the window.

The laminate according to the present invention may further include a decorative film laminated on one surface of the polarizing layer or the window.

The laminate according to the present invention may further include a wear-resistant layer laminated on an outermost surface of a viewing side of the window.

The laminate according to the present invention may further include a hard coating layer laminated between the window and the wear-resistant layer.

A manufacturing method of a touch panel according to the present invention may include steps of sequentially forming a metal layer and a blackening layer on a base layer in a multi-chamber, patterning the metal layer and the blackening layer in a mesh pattern, and etching the metal layer and the blackening layer to form a metal mesh electrode with the blackening layer laminated.

In the manufacturing method of a touch panel according to the present invention, the step of sequentially forming the metal layer and the blackening layer may be performed in a continuous process in the chamber.

In the manufacturing method of a touch panel according to the present invention, the step of etching the metal layer and the blackening layer may etch the metal layer and the blackening layer simultaneously with the same etchant.

Advantageous Effects

In the present invention, the metal layer and the blackening layer are sequentially formed on the base layer in a multi-chamber, and the base layer on which the metal layer is formed is not taken out from the chamber before the blackening layer is formed. As a result, the metal oxide film is not formed between the metal layer and the blackening layer. Accordingly, the metal mesh electrode can be formed so that the side surfaces of the blackening layer and the metal layer become vertical in the etching process. As a result, the present invention may minimizes the reflectance of the metal mesh electrode, thereby minimizing or blocking the visibility problem caused by using the conductive metal as the electrode.

In the present invention, even if etching deviation occurs in the etching process, the positive taper inclination angle of the metal layer is maintained at 80° or more and less than 90°. Through this, the present invention can maintain the reflectance of the metal mesh electrode at an allowable value of 8% or less at an aperture ratio of 90% or more.

In addition, the present invention maintains the reverse taper inclination angle of the metal layer, which may occur due to etching deviation, to be greater than 90° and less than or equal to 100°. Through this, the present invention can maintain the reduction in conductivity of the metal mesh electrode at an allowable value of 5% or less.

BRIEF DESCRIPTION OF THE DRAWINGS

FIGS. 1A and 1B illustrate a touch panel having a metal mesh electrode with a blackening layer laminated according to the prior art.

FIGS. 2A and 2B illustrate the first embodiment of a touch panel having a metal mesh electrode with a blackening layer laminated according to embodiments of the present invention.

FIGS. 3A and 3B illustrate the second and third embodiments of a touch panel having a metal mesh electrode with a blackening layer laminated according to embodiments of the present invention.

FIG. 4 is a flowchart illustrating a process of manufacturing a touch panel having a metal mesh electrode with a blackening layer laminated according to embodiments of the present invention.

BEST MODE

Hereinafter, embodiments of the present invention are described in more detail with reference to the accompanying drawings.

FIGS. 2A and 2B illustrate the first embodiment of a touch panel having a metal mesh electrode with a blackening layer laminated according to the present invention.

As shown in FIGS. 2A and 2B, the touch panel of the first embodiment may include a base layer 210, a metal electrode layer 220, a blackening layer 230, and so on.

The base layer 210 is a base of the metal electrode layer 220, and may be composed of, for example, a cyclo-olefin polymer (COP), polycarbonate, polyethylene terephthalate (PET), polymethyl methacrylate, polyimide, polyethylene naphthalate, polyether sulfone, etc.

The base layer 210 may be a separation layer, a protective layer, or a laminate of a separation layer and a protective layer when the touch panel is manufactured by a transfer method.

The separation layer may be composed of an organic polymer film, for example, polyimide, poly vinyl alcohol, polyamic acid, polyamide, polyethylene, polystyrene, polynorbornene, etc.

The protective layer may include at least one of an organic insulation layer or an inorganic insulation layer, and it can be formed through coating/curing or deposition.

The metal electrode layer 220 is a sensing electrode for sensing a touch, which is formed on the base layer 210 and may be configured as a mesh pattern.

The metal electrode layer 220 may be composed of a conductive metal, for example, gold (Au), silver (Ag), copper (Cu), molybdenum (Mo), aluminum (Al), palladium (Pd), neodymium (Nd), silver-palladium-copper alloy (APC), etc.

The metal electrode layer 220 may consist of a conductive metal alone, or it can also be comprised of laminates, such as a triple layer of nickel-copper layer/copper layer/nickel-copper layer, a triple layer of nickel-copper layer/copper layer/nickel layer, a double layer of nickel-copper layer/copper layer, or a triple layer of black nickel layer/copper layer/black nickel layer.

The metal electrode layer 220 may have a line width of 1.0 µm or more and 2.5 µm or less. When the line width is smaller than 1.0 µm, the resistance increases, which is not preferable. When the line width exceeds 2.5 µm, the resistance decreases, but it is not preferable because it can be visually recognized.

The side surface of the metal electrode layer 220 may be vertical, that is, form an angle θ of 90° with respect to the upper surface of the base layer 210.

The blackening layer 230 improves visibility by reducing the reflectance of the metal electrode layer 220 and may be formed on the metal electrode layer 220.

The blackening layer 230 may be formed by depositing a blackening composition on the metal electrode layer 220. For example, the blackening layer 230 may be formed through a reactive sputtering process. The blackening layer 230 may be formed by a reactive sputtering method with, for example, a CAT (Cu—Al—Ti) target, which is a three-component alloy, argon (Ar) gas, and a reactive gas. In this case, the reactive gas may be oxygen ($O_2$) or nitrogen ($N_2$). As such, when the reactive sputtering process is used, the metal electrode layer 220 and the blackening layer 230 may be continuously formed.

The side surface of the blackening layer 230 may be vertical, that is, form an angle of 90° with respect to the upper surface of the base layer 210. The blackening layer 230 may have the same width as the metal electrode layer 220.

The touch panel of the first embodiment having such a configuration does not include a metal oxide film, which may be formed when the metal electrode layer 220 is exposed to air, on the lamination bonding surface of the metal electrode layer 220 and the blackening layer 230, that is, on the upper surface of the metal electrode layer 220.

FIGS. 3A and 3B illustrate the second and third embodiments of a touch panel having a metal mesh electrode with a blackening layer laminated according to the present invention.

As shown in FIG. 3A, in the touch panel of the second embodiment, a metal electrode layer 220 may be configured to have a side surface of a positive tapered shape in which the lower width is greater than the upper width thereof.

When the blackening layer 230 and the metal electrode layer 220 are etched simultaneously, since a metal oxide film is not present between the blackening layer 230 and the metal electrode layer 220, the blackening layer 230 and the metal electrode layer 220 are firmly attached. As a result, it is possible to block or minimize the accelerated etching of the top part and upper side part of the metal electrode layer 220 during the etching process. Accordingly, if the blackening layer 230 and the metal electrode layer 220 are simultaneously etched, the side surface of the metal electrode layer 220 forms a substantially vertical plane. However, in actual mass production, due to process errors (type of etchant, etching degree, etching environment, etc.), the side surface of the metal electrode layer 220 may be formed in a positive tapered shape in which the lower width is greater than the upper width. However, even in this case, it is necessary to minimize the reflectance due to the opening of the metal electrode layer 220.

Table 1 below shows the measurements of the reflectance of the metal mesh electrode with the blackening layer laminated with respect to an aperture ratio of 90% according to the lateral inclination angle θ of the positive tapered shape.

TABLE 1

| Positive taper inclination angle (°) | Reflectance (%) |
|---|---|
| 90 (vertical) | 1.8 |
| 88 | 2.4 |
| 86 | 3.3 |
| 84 | 4.2 |
| 82 | 6.5 |
| 80 | 7.9 |
| 78 | 9.5 |
| 76 | 11.8 |

Referring to Table 1 above, it can be seen that the lateral inclination angle θ at which the reflectance of the metal mesh electrode is maintained at an allowable value of 8% or less is 80° or more with respect to the upper surface of the base layer 210, at an aperture ratio of 90% or more. Therefore, in the touch panel of the present invention, even if an etching deviation occurs in the etching process, it is preferable to maintain the lateral inclination angle θ of the positive tapered shape of the metal electrode layer 220 to 80° or more and less than 90° (vertical).

As shown in FIG. 3B, in the touch panel according to the third embodiment, the side surface of the metal electrode layer 220 may be configured in a reverse tapered shape in which the lower width is smaller than the upper width.

In the third embodiment, as described in the second embodiment, a metal oxide film is not formed between the blackening layer 230 and the metal electrode layer 220. Accordingly, accelerated etching of the top part and upper side part of the metal electrode layer 220 is blocked or minimized during the etching process, so that the side surface of the metal electrode layer 220 forms a substantially vertical plane. However, in actual mass production, due to process errors (type of etchant, etching degree, etching environment, etc.), opposite to the second embodiment, the side surface of the metal electrode layer 220 may form a reverse tapered shape in which the lower width is smaller than the upper width.

When the metal electrode layer 220 has a reverse tapered shape, unlike the second embodiment, the reflectance of the metal mesh electrode is not a problem, but the resistance of the metal mesh electrode may increase to reduce the conductivity.

Table 2 below shows the measurements of the reduction in conductivity of the metal mesh electrode with the blackening layer laminated according to the lateral inclination angle θ of the reverse tapered shape.

TABLE 2

| Reverse taper inclination angle (°) | Reduction in conductivity (%) |
|---|---|
| 90 (vertical) | 0 |
| 92 | 0.5 |
| 94 | 1.2 |
| 96 | 2.3 |
| 98 | 3.6 |
| 100 | 5.0 |
| 102 | 6.7 |
| 104 | 8.9 |

Referring to Table 2 above, it can be seen that the lateral inclination angle θ capable of maintaining the reduction in conductivity of the metal mesh electrode at an allowable value of 5% or less is up to 100° with respect to the upper surface of the base layer 210. Therefore, in the touch panel of the present invention, even considering the case where an etching deviation occurs in the etching process, it is preferable to maintain the lateral inclination angle θ of the reverse tapered shape of the metal electrode layer 220 to more than 90° (vertical) and 100° or less.

FIG. 4 is a flowchart illustrating a process of manufacturing a touch panel having a metal mesh electrode with a blackening layer laminated according to the present invention.

As shown in FIG. 4, in the process of manufacturing a touch panel according to the present invention, a process of laminating a metal layer 220 on a base layer 210 and a process of laminating a blackening layer 230 on the metal layer 220 may be sequentially performed (S10) in a multi-chamber.

In step S10, the metal layer 220 may be formed in the multi-chamber by a method such as sputtering. When the metal layer 220 has a multilayer structure, the sputtering process may be performed several times.

In step S10, the blackening layer 230 may be formed in the same multi-chamber where the metal layer 220 is formed by a method such as sputtering. The sputtering process for the blackening layer 230 may be performed after sputtering the metal layer 220 without transferring the chamber.

In step S20, the metal layer 220 and the blackening layer 230 may be patterned in a mesh pattern. The patterning may include a photo process, that is, photoresist application, mask alignment, curing process, and the like. Step S20 may be performed in the multi-chamber where the metal layer 220 and the blackening layer 230 are formed, or may be performed in another chamber.

In step S30, the metal layer 220 and the blackening layer 230 may be etched simultaneously with the same etchant to form a metal mesh electrode with the blackening layer laminated. As the etchant, one containing copper chloride as a main component, one containing nitric acid or sulfuric acid, and hydrogen peroxide solution as main components, etc. can be used.

In step S30, the side surfaces of the blackening layer 230 and the metal layer 220 may form a vertical surface, a positive tapered surface, or a reverse tapered surface. The inclination angle of the side surface is preferably formed in the range of 80° to 100°.

As such, in the present invention, in step S10, the metal layer 220 and the blackening layer 230 are sequentially formed in the multi-chamber without taking out the base layer 210 on which the metal layer 220 is formed. Through this, the present invention can block the formation of a metal oxide layer between the metal layer 220 and the blackening layer 230. As a result, the side surfaces of the blackening layer 230 and the metal layer 220 may be formed to be a vertical plane in a subsequent etching process. In addition, in the present invention, it is easy to limit the lateral inclination angle in the range of 80° to 100° even when the side surface is formed as a positive/reverse tapered surface due to a process error.

A laminate according to the present invention may include the touch panel described above and a window laminated on the touch panel.

The laminate according to the present invention may further include a polarizing layer laminated on one surface of the touch panel or the window. As the polarizing layer, for example, those in which a protective layer is formed on at least one surface of a polarizer dyed with iodine or a dichroic dye after stretching a polyvinyl alcohol film, a liquid crystal aligned to have the performance of a polarizer, a transparent film coated with an oriented resin such as polyvinyl alcohol, and then stretched and dyed, or the like may be used.

The laminate according to the present invention may further include a decorative film laminated on one surface of the polarizing layer or the window. The decorative film may include a protective layer, a black matrix, a planarization layer, and so on.

The laminate according to the present invention may include a wear-resistant layer on the outermost surface of the viewing side.

The wear-resistant layer may be formed, for example, on the surface of the viewing side of the hard coating layer to improve wear resistance or prevent contamination by sebum or the like. Here, the hard coating layer may be formed on the window.

The wear-resistant layer may include a structure derived from a fluorine compound. The fluorine compound may have a silicon atom, and it may be preferable to have a hydrolyzable functional group such as an alkoxy group or halogen on the silicon atom.

The hydrolyzable functional group may form a coating film by a dehydration condensation reaction, and may also react with active hydrogen on the surface of the substrate to improve adhesion of the wear-resistant layer.

In addition, when the fluorine compound has a perfluoroalkyl group or a perfluoropolyether structure, it may impart water repellency, which may be preferable. A fluorinated polyorganosiloxane compound having a perfluoropolyether structure and a long-chain alkyl group having 4 or more carbon atoms may be particularly preferable.

As the fluorine compound, two or more types of compounds may be used. It may be preferable to further include a fluorinated organosiloxane compound containing an alkylene group having 2 or more carbon atoms and a perfluoroalkylene group.

The thickness of the wear-resistant layer may be 1 to 20 nm. The wear-resistant layer may have water repellency, and the water contact angle may be 110 to 125°.

The contact angle hysteresis and the dynamic contact angle measured by the sliding contact angle measurement method may be 3 to 20° and 2 to 55°, respectively.

Furthermore, the wear-resistant layer may contain various additives such as a silanol condensation catalyst, an antioxidant, a corrosion inhibitor, an ultraviolet absorber, a light stabilizer, an antibacterial agent, a deodorant, a pigment, a flame retardant, an antistatic agent, etc., in the range that does not impair the effects of the present invention.

A primer layer may be formed between the wear-resistant layer and the hard coating layer. As the primer agent, for example, an epoxy-based compound of an ultraviolet curing agent, a thermosetting agent, a moisture curing agent, or a two-component curing agent can be used.

As the primer agent, a polyamic acid may be used or a silane coupling agent may be used. The thickness of the primer layer may be 0.001 to 2 µm.

In the method of laminating the wear-resistant layer on the hard coating layer, a primer layer is formed by applying, drying, and curing a primer agent as necessary on the hard coating layer, and then a composition containing a fluorine-based compound (composition for wear-resistant coating) can be applied and dried to form a wear-resistant layer. As the coating method, for example, a dip coating method, a roll coating method, a bar coating method, a spin coating method, a spray coating method, a die coating method, a gravure coating method, or the like can be used.

In addition, before applying the primer agent or the composition for wear-resistant coating layer, it may be preferable to perform a hydrophilization treatment such as primer treatment, corona treatment, or ultraviolet treatment on the coated surface.

The laminate of the wear-resistant layer and the hard coating layer may be formed directly on the window, or laminated on a separate transparent substrate, followed by bonding to the window using an adhesive or a pressure-sensitive adhesive.

Although particular embodiments of the present invention have been shown and described, it will be understood by those skilled in the art that it is not intended to limit the present invention to the preferred embodiments, and it will be obvious to those skilled in the art that various changes and modifications may be made without departing from the spirit and scope of the invention.

The scope of the present invention, therefore, is to be defined by the appended claims and equivalents thereof.

DESCRIPTION OF REFERENCE NUMERALS 110, 210: base layer
120, 220: metal electrode layer (metal layer)
130, 230: blackening layer
θ: lateral inclination angle of metal electrode layer (metal layer)
(measured with reference to the upper surface of the base layer)

The invention claimed is:
1. A touch panel, comprising:
a base layer;
a metal electrode layer formed on the base layer and configured in a mesh pattern; and
a blackening layer formed on the metal electrode layer and having the same width as a top width of the metal electrode layer, wherein a side surface of the metal electrode layer has a positive tapered shape in which a bottom width is larger than a top width, and a taper inclination angle is 80° or more and less than 90° with respect to the base layer.

2. A laminate comprising:
the touch panel of claim 1; and
a window laminated on the touch panel.

3. The laminate of claim 2, further comprising a polarizing layer laminated on one surface of the touch panel or the window.

4. The laminate of claim 3, further comprising a decorative film laminated on one surface of the polarizing layer or the window.

5. The laminate of claim 2, further comprising a wear-resistant layer laminated on an outermost surface of a viewing side of the window.

6. The laminate of claim 5, further comprising a hard coating layer laminated between the window and the wear-resistant layer.

7. A touch panel, comprising:
a base layer;
a metal electrode layer formed on the base layer and configured in a mesh pattern; and
a blackening layer formed on the metal electrode layer and having the same width as a top width of the metal electrode layer, wherein a side surface of the metal electrode layer has a reverse tapered shape in which a bottom width is smaller than a top width, and a taper inclination angle is more than 90° and 100° or less with respect to the base layer.

8. A laminate comprising:
the touch panel of claim 7; and
a window laminated on the touch panel.

9. The laminate of claim 8, further comprising a polarizing layer laminated on one surface of the touch panel or the window.

10. The laminate of claim 9, further comprising a decorative film laminated on one surface of the polarizing layer or the window.

11. The laminate of claim 8, further comprising a wear-resistant layer laminated on an outermost surface of a viewing side of the window.

12. The laminate of claim 11, further comprising a hard coating layer laminated between the window and the wear-resistant layer.

13. A manufacturing method of a touch panel, comprising steps of:
sequentially forming a metal layer and a blackening layer on a base layer in a multi-chamber;
patterning the metal layer and the blackening layer in a mesh pattern;
etching the metal layer and the blackening layer to form a metal mesh electrode with the blackening layer laminated,
wherein the blackening layer has the same width as a top width of the metal mesh electrode, and
wherein a side surface of the metal mesh electrode has a positive tapered shape in which a bottom width is larger than a top width, and a taper inclination angle is 80° or more and less than 90° with respect to the base layer.

14. The manufacturing method of a touch panel of claim 13, wherein the step of sequentially forming the metal layer and the blackening layer is performed in a continuous process in the multi-chamber.

15. The manufacturing method of a touch panel of claim 14, wherein the step of etching the metal layer and the blackening layer etches the metal layer and the blackening layer simultaneously with the same etchant.

16. A manufacturing method of a touch panel, comprising steps of:
sequentially forming a metal layer and a blackening layer on a base layer in a multi-chamber;
patterning the metal layer and the blackening layer in a mesh pattern; and
etching the metal layer and the blackening layer to form a metal mesh electrode with the blackening layer laminated,
wherein the blackening layer has the same width as a top width of the metal mesh electrode, and
wherein a side surface of the metal mesh electrode has a reverse tapered shape in which a bottom width is smaller than a top width, and a taper inclination angle is more than 90° and 100° or less with respect to the base layer.

17. The manufacturing method of a touch panel of claim 16, wherein the step of sequentially forming the metal layer and the blackening layer is performed in a continuous process in the multi-chamber.

18. The manufacturing method of a touch panel of claim 17, wherein the step of etching the metal layer and the blackening layer etches the metal layer and the blackening layer simultaneously with the same etchant.

\* \* \* \* \*